US010885468B2

(12) United States Patent
Parkunan et al.

(10) Patent No.: US 10,885,468 B2
(45) Date of Patent: Jan. 5, 2021

(54) DYNAMIC SEARCH SYSTEM FOR REAL-TIME DYNAMIC SEARCH AND REPORTING

(71) Applicant: Accenture Global Solutions Limited, Dublin (IE)

(72) Inventors: Sathiyaraj Parkunan, Chennai (IN); Sanjay Sainath, Chennai (IN); Noorul Aleem Mohamed, Chennai (IN); Raj Arun Ramalingam, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 195 days.

(21) Appl. No.: 15/603,919

(22) Filed: May 24, 2017

(65) Prior Publication Data

US 2017/0344641 A1      Nov. 30, 2017

(30) Foreign Application Priority Data

May 31, 2016   (IN) .............................. 201641018654

(51) Int. Cl.
*G06F 16/00*      (2019.01)
*G06N 20/00*      (2019.01)
*G06F 16/33*      (2019.01)

(52) U.S. Cl.
CPC ......... *G06N 20/00* (2019.01); *G06F 16/3334* (2019.01); *G06F 16/3338* (2019.01)

(58) Field of Classification Search
CPC .. G06N 20/00; G06F 16/3338; G06F 16/3334
See application file for complete search history.

(56) References Cited

U.S. PATENT DOCUMENTS

| 2003/0069880 | A1* | 4/2003 | Harrison | ............. G06F 16/3334 |
| 2005/0086204 | A1* | 4/2005 | Coiera | .................. G06F 16/951 |
| 2008/0243787 | A1* | 10/2008 | Stading | ................. G06F 16/951 |
| 2012/0078869 | A1* | 3/2012 | Bellville | ................. G06F 16/90 |
| | | | | 707/706 |

(Continued)

OTHER PUBLICATIONS

Greedy Algorithm (Year: 2012).*

(Continued)

*Primary Examiner* — Mark D Featherstone
*Assistant Examiner* — Kweku William Halm
(74) *Attorney, Agent, or Firm* — Harrity & Harrity, LLP

(57) ABSTRACT

A device may receive input indicating one or more search parameters associated with a search. The device may perform a comparison of the input and a dictionary file to identify the one or more search parameters associated with the search. The dictionary file may be associated with a domain specific language. The device may determine a combination or quantity of search parameters associated with the search based on a result of the comparison. The device may select a search template to be used to perform the search based on the combination or quantity of search parameters. The search template may be populated with information identifying the one or more search parameters. The device may perform the search using the search template populated with the information identifying the one or more search parameters. The device may perform an action based on a result of performing the search.

20 Claims, 9 Drawing Sheets

(56) References Cited

U.S. PATENT DOCUMENTS

| | | | | |
|---|---|---|---|---|
| 2014/0149393 A1* | 5/2014 | Bhatt | .................... | G06F 16/245 |
| | | | | 707/722 |
| 2015/0302094 A1* | 10/2015 | Bobick | ............... | G06F 17/2795 |
| | | | | 707/706 |
| 2016/0026686 A1* | 1/2016 | Lakshminath | ...... | G06F 21/6227 |
| | | | | 707/713 |
| 2016/0148209 A1* | 5/2016 | Hammond | ........... | G06Q 30/016 |
| | | | | 705/21 |
| 2017/0024657 A1* | 1/2017 | Sahu | ........................ | G06N 7/02 |

OTHER PUBLICATIONS

IRA (Year: 2012).*
Wikipedia, "Market analysis," https://en.wikipedia.org/wiki/Market_analysis, Mar. 21, 2017, 7 pages.
IBM, "IBM Watson Analytics," https://www.ibm.com/us-en/marketplace/watson-analytics, Dec. 28, 2016, 4 pages.
Microsoft "What is Power BI?," https://powerbi.microsoft.com/en-us/what-is-power-bi/, Jan. 26, 2016, 4 pages.

* cited by examiner

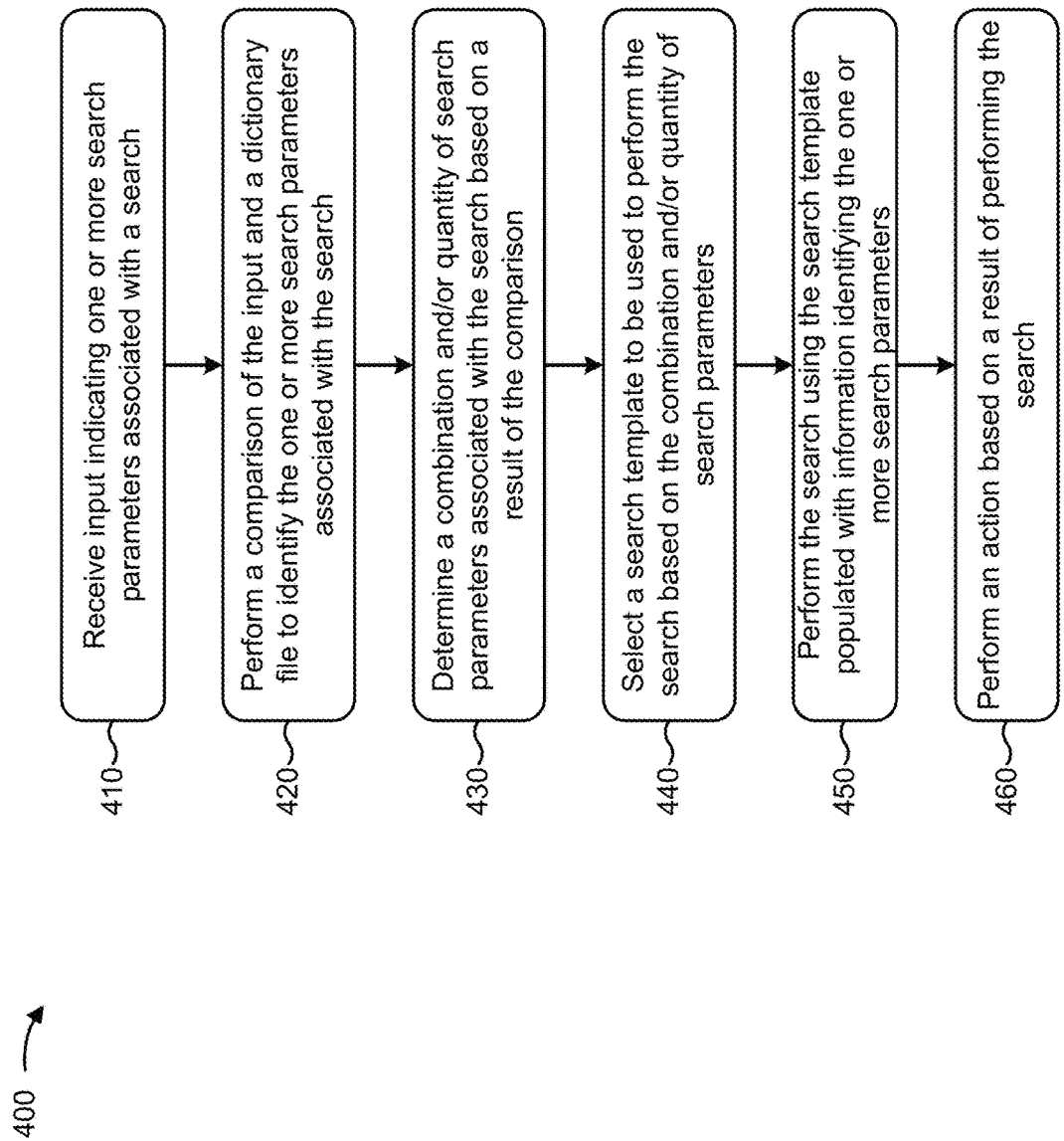

US 10,885,468 B2

DYNAMIC SEARCH SYSTEM FOR REAL-TIME DYNAMIC SEARCH AND REPORTING

RELATED APPLICATION(S)

This application claims priority under 35 U.S.C. § 119 to Indian Provisional Patent Application No. 201641018654, filed on May 31, 2016, the content of which is incorporated by reference herein in its entirety.

BACKGROUND

A market analysis may include analysis of the attractiveness and the dynamics of a particular market within a particular industry. A market analysis may include a documented investigation of a market that is used to inform an organization's planning activities, particularly related to decisions of inventory, purchases, work force expansion or contraction, facility expansion, purchases of capital equipment, promotional activities, and/or the like.

SUMMARY

According to some possible implementations, a device may include one or more processors to receive input indicating one or more search parameters associated with a search. The input may include text data or audio data. The one or more processors may perform a comparison of the input and a dictionary file to identify the one or more search parameters associated with the search. The dictionary file may be associated with a domain specific language. The one or more processors may determine a combination or quantity of search parameters associated with the search based on a result of the comparison. The one or more processors may select a search template to be used to perform the search based on the combination or quantity of search parameters. The search template may be populated with information identifying the one or more search parameters. The one or more processors may perform the search using the search template populated with the information identifying the one or more search parameters. The search may be of an information source. The one or more processors may perform an action based on a result of performing the search.

According to some possible implementations, a method may include receiving, by a device, input indicating multiple search parameters associated with a search. The method may include performing, by the device, multiple comparisons of the input and multiple dictionary files to identify the multiple search parameters associated with the search. The multiple dictionary files may include multiple terms or phrases that the device can use to perform the search. The multiple terms or phrases may correspond to the multiple search parameters. The method may include determining, by the device, the multiple search parameters associated with the search based on multiple results of the multiple comparisons. The method may include selecting, by the device, multiple search templates to be used to perform the search based on the multiple search parameters. A search template, of the multiple search templates, may be associated with a set of search parameters, of the multiple search parameters. The method may include populating, by the device, the multiple search templates with information identifying the multiple search parameters. The information may identify the multiple search parameters being obtained from the multiple dictionary files. The method may include performing, by the device, the search using the multiple search templates populated with the multiple search parameters. The method may include performing, by the device, multiple actions based on multiple results of performing the search.

According to some possible implementations, a non-transitory computer-readable medium may store one or more instructions that, when executed by one or more processors, cause the one or more processors to receive input indicating one or more search parameters associated with one or more searches. The one or more instructions, when executed by the one or more processors, may cause the one or more processors to perform one or more comparisons of the input and one or more dictionary files to identify the one or more search parameters associated with the one or more searches. The one or more dictionary files may include one or more hierarchies of nodes that can be traversed to identify the one or more search parameters. The one or more instructions, when executed by the one or more processors, may cause the one or more processors to determine one or more combinations or quantities of search parameters associated with the one or more searches based on one or more results of the one or more comparisons. The one or more combinations or quantities of search parameters may be associated with one or more search templates to be used to perform the one or more searches. The one or more instructions, when executed by the one or more processors, may cause the one or more processors to select the one or more search templates based on the one or more combinations or quantities of search parameters. The one or more instructions, when executed by the one or more processors, may cause the one or more processors to populate the one or more search templates with information identifying the one or more search parameters. The information may identify the one or more search parameters being identified by traversing the one or more hierarchies of nodes included in the one or more dictionary files. The one or more instructions, when executed by the one or more processors, may cause the one or more processors to perform the one or more searches using the one or more search templates populated with the information identifying the one or more search parameters. The one or more instructions, when executed by the one or more processors, may cause the one or more processors to perform one or more actions based on one or more results of performing the one or more searches.

BRIEF DESCRIPTION OF THE DRAWINGS

FIG. 4 is a flow chart of an example process for real-time dynamic search and reporting.

DETAILED DESCRIPTION

The following detailed description of example implementations refers to the accompanying drawings. The same reference numbers in different drawings may identify the same or similar elements.

A user may want to obtain real-time data, such as sales data, from a database. In some cases, the user may not have an understanding of code, systems, and/or technical details needed to obtain such data from the database. Some implementations, described herein, provide a dynamic search system that is capable of receiving input indicating one or more search parameters associated with a search, performing a comparison of the input and a dictionary file, determining a combination and/or quantity of search parameters associated with the search, selecting a search template to be used to perform the search, performing the search using the search template, and/or performing an action after performing the search.

In this way, the implementations provide an intuitive and accessible way for users to obtain a wide variety of information from databases in real-time without deep technical knowledge of database search queries. This increases an efficiency of obtaining information from databases by reducing an amount of time needed to obtain the information and/or reducing an amount of technical knowledge needed to obtain the information. In addition, this conserves processing resources of a dynamic search system by reducing or eliminating improperly formatted search queries and/or by reducing a quantity of searches performed by the dynamic search system.

Figure 1A:
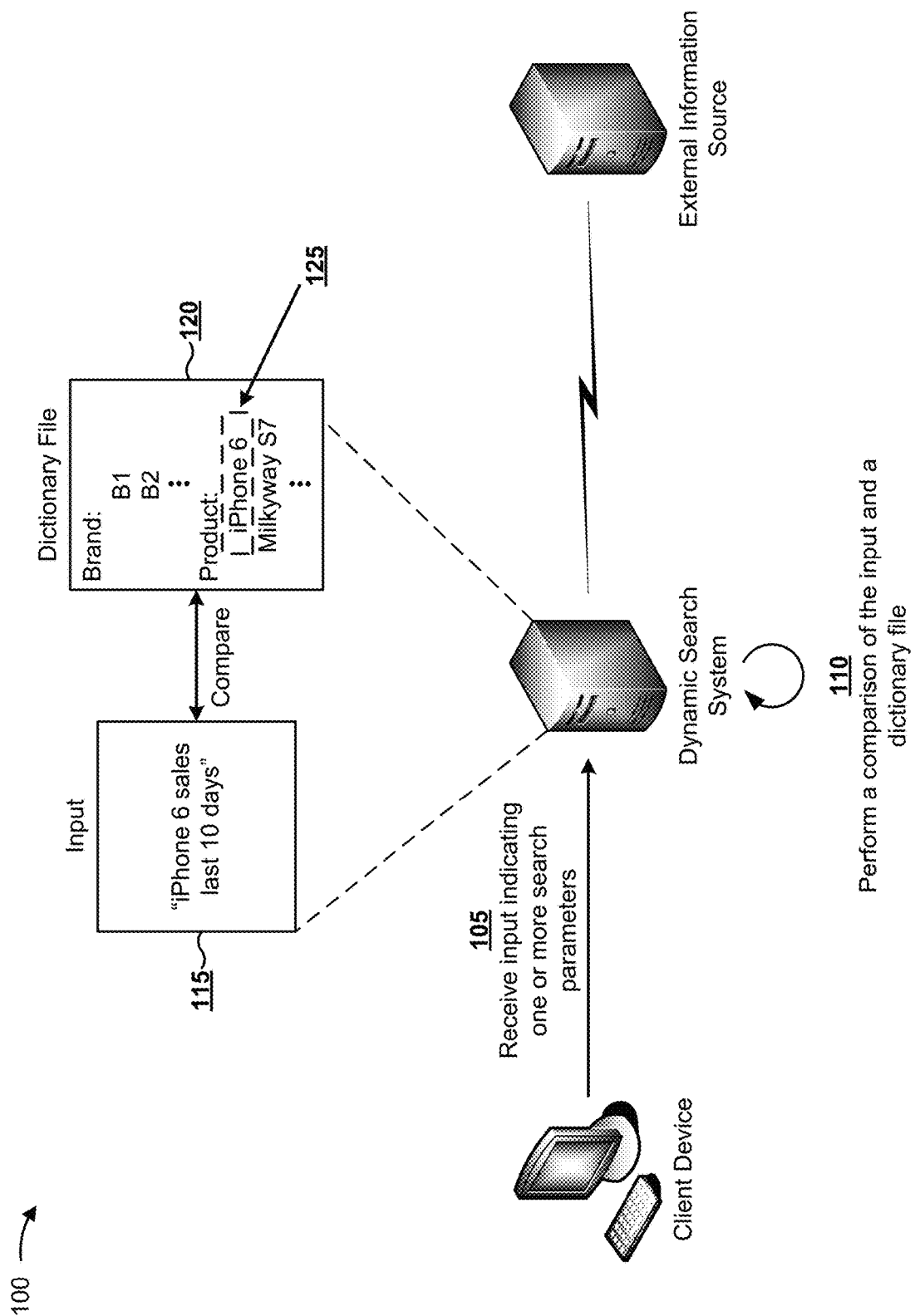
FIGS. 1A-1C are diagrams of an overview of an example implementation described herein.
Figure 1B:
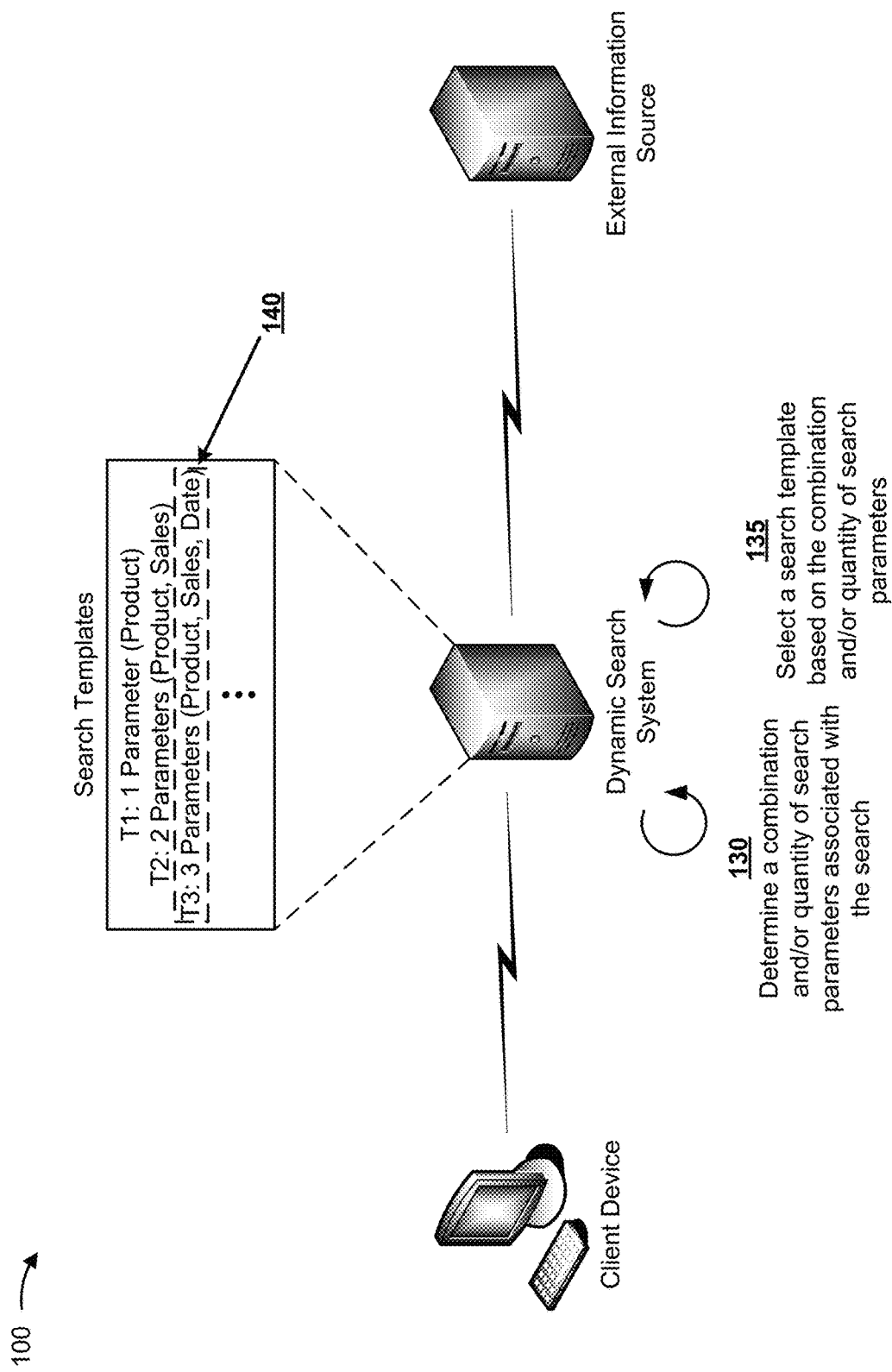
Figure 1C:
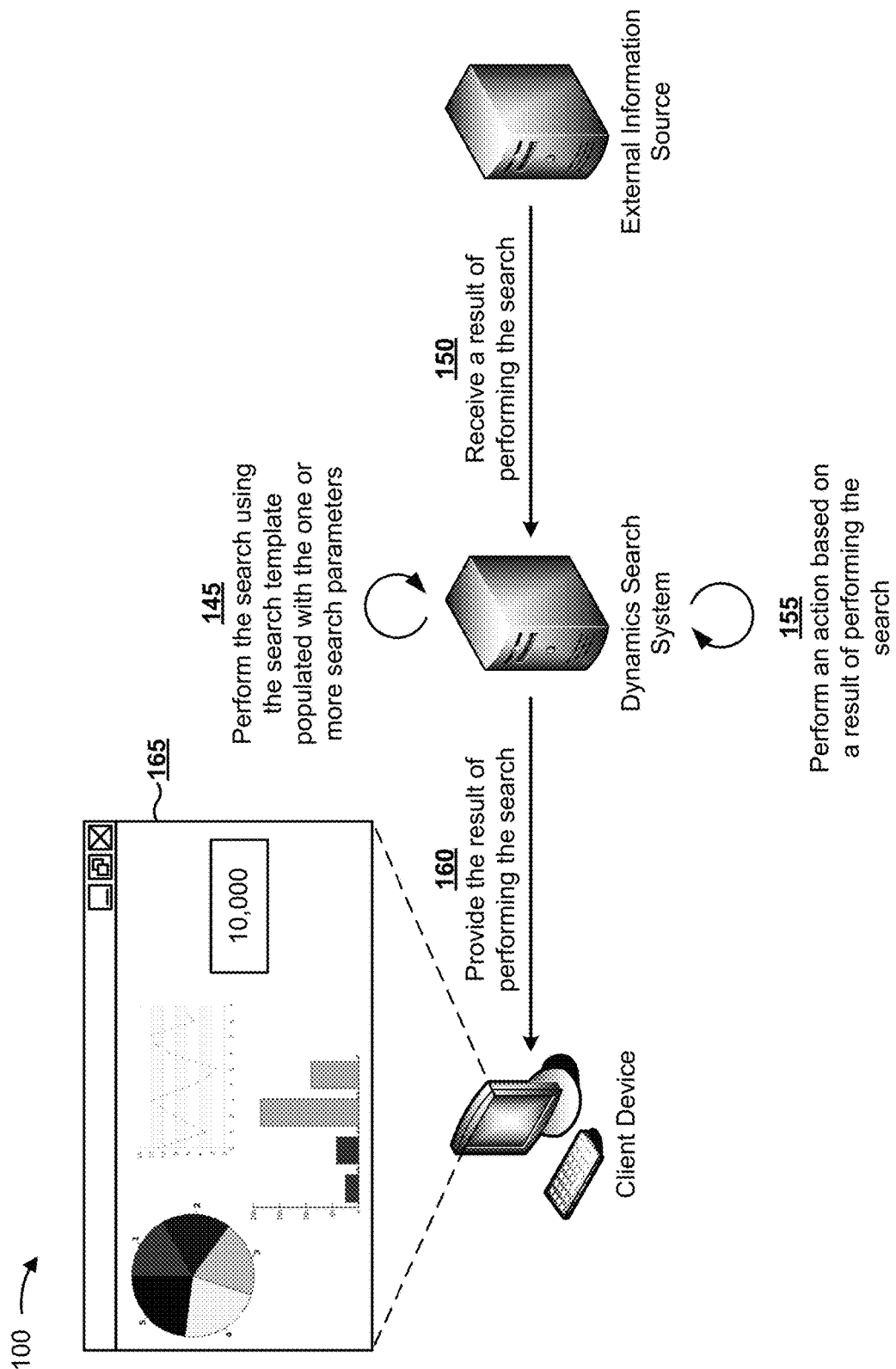

FIGS. 1A-1C are diagrams of an overview of an example implementation 100 described herein. As shown, example implementation 100 may include a client device, a dynamic search system, and/or an external information source.

As shown in FIG. 1A, and by reference number 105, the dynamic search system may receive input indicating one or more search parameters of a search for data (e.g., from the client device). For example, the input may include text input, audio (e.g., voice) input, and/or the like. In some implementations, the dynamic search system may process the input using a technique. For example, the dynamic search system may process the input using natural language processing, computational linguistics, speech-to-text, automatic speech recognition, artificial intelligence, and/or the like. Continuing with the previous example, the dynamic search system may process the input to identify a term and/or phrase included in the input, to convert audio input to text input, and/or the like. In this way, the dynamic search system may process the input into a form that the dynamic search system can use to perform a search for information.

As shown by reference number 110, the dynamic search system may perform a comparison of the input and a dictionary file (e.g., to identify the one or more search parameters associated with the search). For example, the dynamic search system may compare terms of the input and a set of terms and/or phrases included in the dictionary file. The dictionary file may contain a set of terms and/or phrases that the dynamic search system can use to perform a search for information. For example, the set of terms and/or phrases in the dictionary file may correspond to row labels, column labels, keys, and/or data elements stored in a database.

The dynamic search system may select a dictionary file from a group of dictionary files. For example, the dynamic search system may select a dictionary file based on the database to be searched (e.g., using information identifying the database to be searched), a prediction of a database to be searched (e.g., based on a type of the data requested), a term and/or phrase included in the input, a suggested search generated by the dynamic search system, a location of a user of the dynamic search system, prior searches associated with a user of the dynamic search system, an organization for which a user of the dynamic search system works, and/or the like.

As further shown in FIG. 1A, the dynamic search system may perform a comparison of input 115 (e.g., "iPhone 6 sales last 10 days" associated with a search for information related to sales of a particular product during a time period) and dictionary file 120. For example, assume that the dynamic search system parsed input 115 to identify the following set of terms and/or phrases: "iPhone 6," "sales," and "last 10 days." The dynamic search system may perform a comparison of the identified set of terms and/or phrases and the dictionary file. For example, as shown by reference number 125, the dynamic search system may identify a match between the phrase "iPhone 6" included in input 115 and the term "iPhone 6" included in the dictionary file. Similarly, and as another example, the comparison may indicate matches for "sales" and/or "last 10 days." In this way, the dynamic search system may determine a term and/or phrase included in the input based on performing a comparison of the input and a dictionary file.

As shown in FIG. 1B, and by reference number 130, the dynamic search system may determine a combination and/or quantity of search parameters associated with the search. The dynamic search system may identify one or more search parameters for a search based on the comparison indicating a match. For example, the dynamic search system may identify "iPhone 6" (rather than another product), "sales" data (e.g., rather than returns data, deliveries data, etc.), and/or "last 10 days" (rather than another time period) as the one or more parameters for the search, thereby identifying a combination of search parameters to be used to perform the search. The dynamic search system may determine a quantity of search parameters for the search based on a quantity of matches the comparison indicates. For example, the dynamic search system may determine that the search has three search parameters based on the comparison indicating three matches (e.g., "iPhone 6," "sales," and "last 10 days").

As shown by reference number 135, the dynamic search system may select a search template to be used to perform the search. For example, the dynamic search system may select the search template based on the combination and/or quantity of search parameters identified for the search. In some cases, the search template may be database specific (e.g., different search templates may be associated with different databases), topic specific (e.g., different search templates for different types of data, different contexts, different topics, etc.), database protocol specific (e.g., different search templates for different database protocols), and/or the like.

As shown by reference number 140, the dynamic search system may select search template T3 based on template T3 having being structured to receive three search parameters, which is the same quantity of search parameters that the dynamic search system identified from input 115 (not shown). In addition, the dynamic search system may select search template T3 based on template T3 being structured to receive the same type of parameters identified in input 115 (not shown). For example, and as shown, template T3 may be structured to receive a product identifier as a first search parameter (e.g., shown as "Product"), a second search parameter related to a search for sales data (e.g., shown as "sales"), and a date or time period as a third search parameter (e.g., shown as "Date"). Continuing with the previous example, the input "iPhone 6" may correspond to the first search parameter, the input "sales" may correspond to the second search parameter, and the input "last 10 days" may correspond to the third search parameter. In this way, the dynamic search system may select a search template to be used to perform a search without needed input from a user as to which template to select. This reduces an amount of technical skill needed for a user to request the dynamic search system to perform a search. In addition, this conserves processing resources of the dynamic search system by reducing a quantity of error-containing searches that the dynamic search system performs.

As shown in FIG. 1C, and by reference number 145, the dynamic search system may perform the search using the search template populated with the one or more search parameters. For example, the dynamic search system may perform the search using search template T3, where the search template has been populated with "iPhone 6" as the first search parameter, "sales" as the second search parameter, and a date range for the previous 10 days as the third search parameter. The dynamic search system may search public and/or private databases when performing the search.

As shown by reference number 150, the dynamic search system may receive a result of performing the search (e.g., from the external information source). For example, the dynamic search system may receive information related to iPhone 6 sales during the last 10 days. The dynamic search system may receive the search results from external information sources associated with various organizations, external information sources associated with point-of-sale systems at various retail outlets of an organization, an external information source associated with a trade organization, and/or the like.

As shown by reference number 155, the dynamic search system may perform an action based on a result of performing the search. For example, the dynamic search system may determine a characteristic of the data received from the external information source (e.g., a type of data received, whether the data can be aggregated or grouped into various categories, etc.). Continuing with the previous example, the dynamic search system may determine a manner in which to provide the data for display based on a determined characteristic, may determine a configuration of a user interface to be used to display the data based on a determined characteristic, and/or the like.

As shown by reference number 160, the dynamic search system may provide the result of performing the search to the client device (e.g., for display). The dynamic search system may additionally provide a set of instructions to the client device indicating a manner in which to display data, a manner in which to configure a user interface, and/or the like. For example, as shown by reference number 165, the client device may provide various charts, graphs, statistics, and/or the like for display based on the set of instructions from the dynamic search system.

In this way, some implementations, described herein, provide an intuitive and accessible way for users to obtain a wide variety of information from databases in real-time without deep technical knowledge of database search queries. This increases an efficiency of obtaining information from databases by reducing an amount of time needed to obtain the information and/or reducing an amount of technical knowledge needed to obtain the information. In addition, this conserves processing resources of a dynamic search system by reducing or eliminating improperly formatted search queries and/or by reducing a quantity of searches performed by the dynamic search system.

As indicated above, FIGS. 1A-1C are provided merely as an example. Other examples are possible and may differ from what was described with regard to FIGS. 1A-1C.

Figure 2:
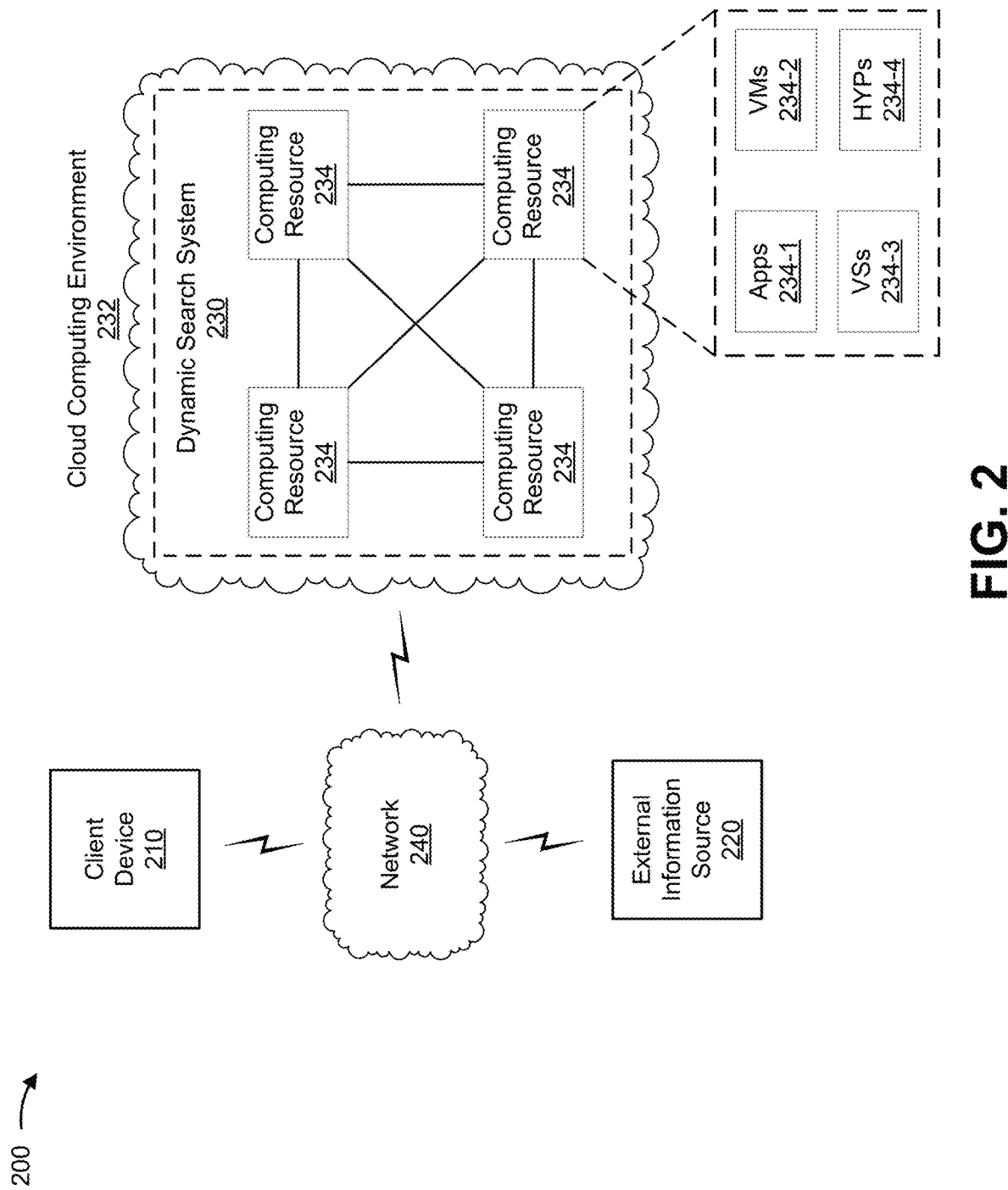
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, external information source 220, dynamic search system 230, cloud computing environment 232, and a set of computing resources 234. Devices of environment 200 may interconnect via wired connections, wireless connections, or a combination of wired and wireless connections.

Client device 210 includes one or more devices capable of receiving, generating, storing, processing, and/or providing information associated with real-time dynamic search and reporting. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may receive data associated with an analysis that dynamic search system 230 has performed, as described elsewhere herein. Additionally, or alternatively, client device 210 may provide information for display (e.g., information related to an analysis of data related to customers, products, services, geographical areas of operation, and/or the like, of an organization), as described elsewhere herein.

External information source 220 includes one or more devices capable of receiving, generating, storing, processing, and/or providing information associated with real-time dynamic search and reporting. For example, external information source 220 may include a server (e.g., a server in a data center or a cloud computing environment, a database server, a server acting as a front end to a group of databases), a data center (e.g., a multi-server micro data center), a workstation computer, a virtual machine (VM) provided in a cloud computing environment, or a similar type of device. In some implementations, external information source 220 may provide, to dynamic search system 230, information related to customers of an organization, as described elsewhere herein. Additionally, or alternatively, external information source 220 may store information related to an analysis of customers of an organization, as described elsewhere herein.

Dynamic search system 230 includes one or more devices capable of real-time dynamic search and reporting. For example, dynamic search system 230 may include a cloud server or a group of cloud servers. In some implementations, dynamic search system 230 may be designed to be modular such that certain software components can be swapped in or out depending on a particular need. As such, dynamic search system 230 may be easily and/or quickly reconfigured for different uses.

In some implementations, as shown, dynamic search system 230 may be hosted in cloud computing environment 232. Notably, while implementations described herein describe dynamic search system 230 as being hosted in cloud computing environment 232, in some implementations, dynamic search system 230 may not be cloud-based (i.e., may be implemented outside of a cloud computing environment) or may be partially cloud-based.

Cloud computing environment 232 includes an environment that hosts dynamic search system 230. Cloud computing environment 232 may provide computation, software, data access, storage, and/or other services that do not require end-user knowledge of a physical location and configuration of a system and/or a device that hosts dynamic search system 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device.

In some implementations, computing resource 234 may host dynamic search system 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with dynamic search system 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
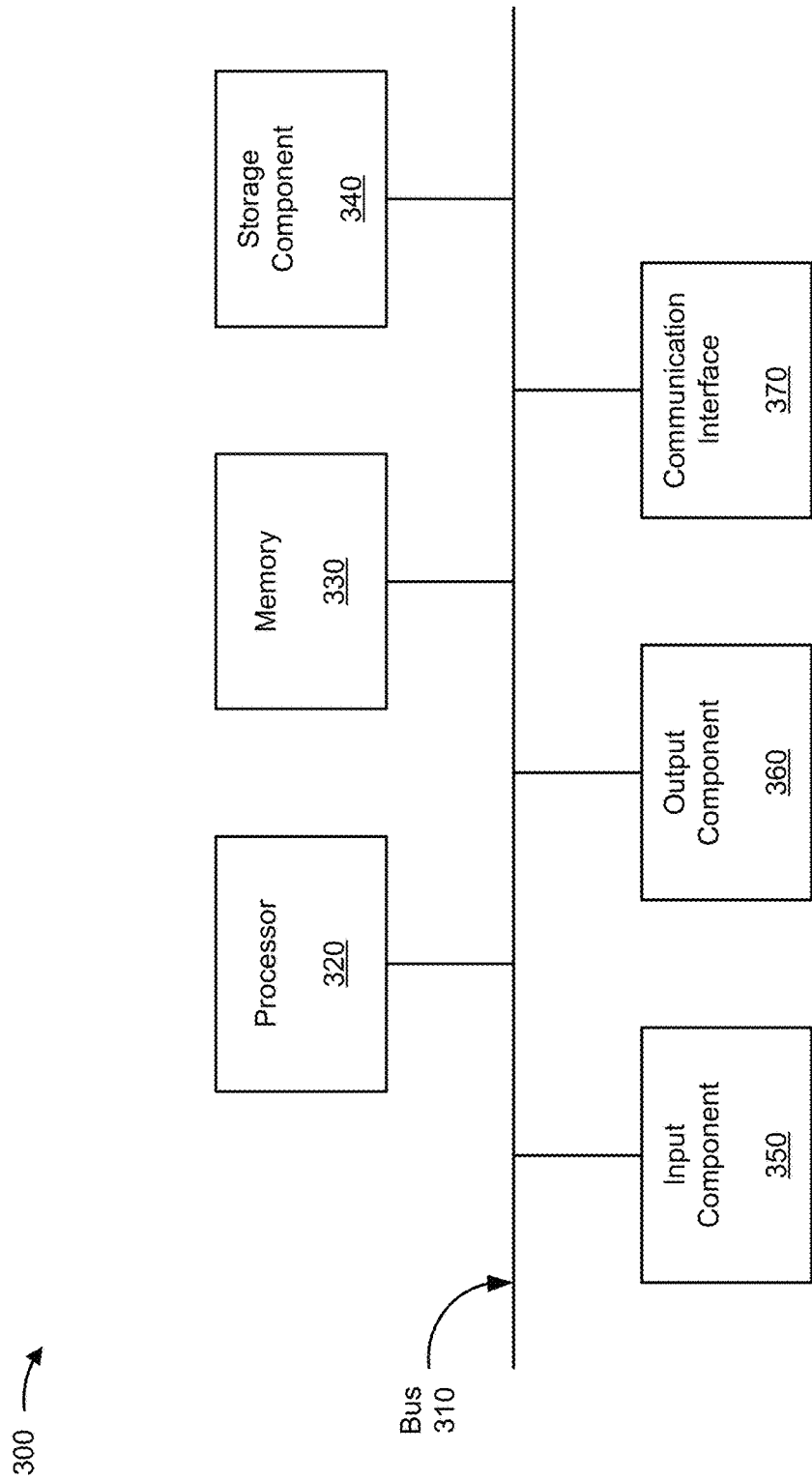
FIG. 3 is a diagram of example components of one or more devices of FIG. 2.

FIG. 3 is a diagram of example components of a device 300. Device 300 may correspond to client device 210, external information source 220, and/or dynamic search system 230. In some implementations, client device 210, external information source 220, and/or dynamic search system 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for real-time dynamic search and reporting. In some implementations, one or more process blocks of FIG. 4 may be performed by dynamic search system 230. In some implementations, one or more process blocks of FIG. 4 may be performed by another device or a group of devices separate from or including dynamic search system 230, such as client device 210 and/or external information source 220.

As shown in FIG. 4, process 400 may include receiving input indicating one or more search parameters associated with a search (block 410). For example, dynamic search system 230 may receive input indicating one or more search parameters associated with a search. In some implementations, dynamic search system 230 may receive the input periodically, according to a schedule, from client device 210 and/or external information source 220, based on requesting the input, and/or the like.

In some implementations, the input may include text data, audio data (e.g., voice input), and/or the like. For example, the input may include a character string input into a text box on a user interface of dynamic search system 230 or client device 210, text of a message (e.g., an email or a short message service (SMS) message) sent to dynamic search system 230, and/or the like. Additionally, or alternatively, and as another example, the input may include audio data received via a microphone associated with client device 210 and/or dynamic search system 230.

In some implementations, dynamic search system 230 may process the input using a technique, such as to put the input into a form that dynamic search system 230 can use to perform a search. For example, dynamic search system 230 may use natural language processing, text processing, computational linguistics, artificial intelligence, and/or the like to identify a term and/or a phrase included in text data, add and/or remove spaces from text data, fix a spelling error in text data, expand or contract an acronym included in text data, and/or the like. Additionally, or alternatively, and as another example, dynamic search system 230 may use speech-to-text, computer speech recognition, automatic speech recognition, and/or the like to identify a term and/or phrase in audio data, convert audio data to text data, and/or the like.

In some implementations, the input may indicate one or more search parameters associated with a search (e.g., a search of a data structure, a database, a data store, etc. for data). For example, a term and/or a phrase included in the input may indicate a search parameter associated with the search. In some implementations, a search parameter may include a character or string of characters that define a search. For example, a search parameter may identify an object, a concept, an action, a date, etc. associated with a search.

In some implementations, dynamic search system 230 may use a search parameter to obtain (e.g., perform a look up of or a search for) information from external information source 220, as described in more detail elsewhere herein. In some implementations, external information source 220 may include proprietary data (e.g., sales data, product data, employee data, or other data that is not publically accessible) and/or public data (e.g., data that is publically accessible).

In some implementations, dynamic search system 230 may determine a context of input. For example, dynamic search system 230 may determine a context of input based on a search parameter identified in the input, a term and/or phrase included in the input, a prior search that the user of dynamic search system 230 has performed, multiple searches by multiple other users of dynamic search system 230, an organization for which the user of dynamic search system 230 works, profile information associated with the user of dynamic search system 230 (e.g., to permit dynamic search system 230 to predict a context), a location of a user of dynamic search system 230, online activity of the user of dynamic search system 230, information from external information source 220, and/or the like. This improves a search that dynamic search system 230 performs by permitting dynamic search system 230 to more accurately determine a search parameter.

In this way, dynamic search system 230 may receive input indicating one or more search parameters associated with a search.

As further shown in FIG. 4, process 400 may include performing a comparison of the input and a dictionary file to identify the one or more search parameters associated with the search (block 420). For example, dynamic search system 230 may perform a comparison of the input and a dictionary file to identify the one or more search parameters associated with the search. In some implementations, dynamic search system 230 may perform the comparison automatically after receiving the input, based on receiving a threshold amount of input, based on receiving an indication to perform the comparison (e.g., from client device 210), and/or the like.

In some implementations, a dictionary file may include a file of terms and/or phrases that dynamic search system 230 can use to search for data that external information source 220 stores. For example, the terms and/or phrases in a dictionary file may correspond to a type of data that external information source 220 stores, a category of data that external information source 220 stores, row and/or column headings for data that external information source 220 stores, data elements that external information source 220 stores, and/or the like.

In some implementations, a dictionary file may be associated with a domain specific language (e.g., a set of terms and/or phrases associated with a particular context). For example, if dynamic search system 230 is deployed in a retail context, a domain specific language with which a dictionary file is associated may include retail-related terms and/or phrases, such as product names or identifiers, brand names or identifiers, the term "sales" to be used with a search for sales data, the term "returns" to be used with a search for returns data, and/or the like. Continuing with the previous example, a retail-related domain specific language may not include terms and/or phrases related to manufacturing, information technology, and/or other contexts. This conserves processing resources of dynamic search system 230 by reducing a quantity of terms and/or phrases which dynamic search system 230 has to use to perform a comparison when dynamic search system 230 is deployed for use in a particular context (e.g., a retail context).

In some implementations, dynamic search system 230 may select a dictionary file from a group of dictionary files. For example, dynamic search system 230 may select a dictionary file based on a database to be searched (e.g., using information identifying the database to be searched), a prediction of a database to be searched (e.g., based on a type of the data requested), a context of a search, a term and/or phrase included in the input, a suggested search generated by dynamic search system 230, a location of a user of dynamic search system 230, prior searches associated with a user of dynamic search system 230, an organization for which a user of dynamic search system 230 works, and/or the like.

In some implementations, dynamic search system 230 may perform a comparison to identify a term and/or phrase included in the input that corresponds to a term and/or phrase included in a dictionary file. For example, dynamic search system 230 may perform a comparison to identify a term and/or phrase to use to perform a search. In some implementations, dynamic search system 230 may identify a term and/or phrase in a dictionary file when a comparison indicates a match (e.g., an exact match). Additionally, or alternatively, dynamic search system 230 may identify a term and/or phrase when a comparison indicates a partial match.

For example, dynamic search system 230 may identify a term and/or phrase when a term included in the input is a synonym of a term included in the dictionary file (e.g., determined using information that identifies a synonym of a term in a dictionary file), when a term and/or phrase included in the input has a threshold quantity or percentage of characters in common (e.g., that are the same) with a term and/or phrase included in a dictionary file, when a term included in input and a term in a dictionary file have a common root term (e.g., "process" may be a root term of "processor," "processed," "processing," etc.), and/or the like. Additionally, or alternatively, and as another example, dynamic search system 230 may identify a term and/or phrase when a term included in the input is a species term of a genus term included in a dictionary file and/or when a term included in the input is a genus term of a species term included in a dictionary file. In some implementations, when dynamic search system 230 identifies a partial match, dynamic search system 230 may provide information identifying a term and/or phrase included in the dictionary file as a suggested modification to a term and/or phrase included in the input, thereby improving a result of a search.

In some implementations, when performing a comparison, dynamic search system 230 may map a term and/or phrase (e.g., included in dictionary file) to an identifier that identifies the term and/or phrase. For example, the identifier may be used in association with performing a search. In some implementations, multiple identifiers may have a hierarchical relationship. For example, multiple identifiers may have a hierarchical relationship where some of the multiple identifiers are parent nodes or root nodes in the hierarchical relationship and other of the multiple identifiers are child nodes of the parent nodes or leaf nodes of the root nodes. As a specific example, a particular brand identifier may be a child node of a "brand" parent node. In some implementations, dynamic search system 230 may traverse the hierarchy (e.g., from parent node to child node or root node to leaf node) to determine an identifier that matches or is associated with an identified term and/or phrase.

In some implementations, dynamic search system 230 may identify a search parameter based on a result of a comparison. For example, an identified term and/or phrase in a dictionary file may correspond to a search parameter. Additionally, or alternatively, and as another example, an identifier that identifies a term and/or phrase in a dictionary file may correspond to a search parameter.

In this way, dynamic search system 230 may perform a comparison of the input and a dictionary file to identify the one or more search parameters associated with the search.

As further shown in FIG. 4, process 400 may include determining a combination and/or quantity of search parameters associated with the search based on a result of the comparison (block 430). For example, dynamic search system 230 may determine a combination and/or quantity of search parameters associated with the search based on a result of the comparison.

In some implementations, dynamic search system 230 may determine a combination of search parameters associated with a search. For example, dynamic search system 230 may determine a combination of search parameters based on a combination of terms and/or phrases identified in a dictionary file that match terms and/or phrases of the input. Additionally, or alternatively, and as another example, dynamic search system 230 may determine a combination of search parameters based on a combination of identifiers associated with terms and/or phrases identified in a dictionary file that match terms and/or phrases of the input. In some implementations, the combination of search parameters may correspond to a particular node of a hierarchy of nodes related to terms and/or phrases included in a dictionary file.

Additionally, or alternatively, dynamic search system 230 may determine a quantity of search parameters associated with a search. For example, dynamic search system 230 may determine a quantity of terms and/or phrases in a dictionary file that correspond to the input that dynamic search system 230 received. Additionally, or alternatively, and as another example, dynamic search system 230 may determine a quantity of identifiers that identify terms and/or phrases identified in a dictionary file as corresponding to the input that dynamic search system 230 received. Additionally, or alternatively, and as another example, dynamic search system 230 may determine a quantity of nodes of a hierarchy of nodes associated with terms and/or phrases included in a dictionary file that correspond to input that dynamic search system 230 received. This conserves processing resources of dynamic search system 230 by permitting dynamic search system 230 to quickly and efficiently determine a combination and/or quantity of search parameters included in the input.

In this way, dynamic search system 230 may determine a combination and/or quantity of search parameters associated with the search based on a result of the comparison.

As further shown in FIG. 4, process 400 may include selecting a search template to be used to perform the search based on the combination and/or quantity of search parameters (block 440). For example, dynamic search system 230 may select a search template to be used to perform the search based on the combination and/or quantity of search parameters. In some implementations, dynamic search system 230 may select a search template from multiple search templates, as described elsewhere herein.

In some implementations, a search template may include a template for a search and/or query of data from external information source 220. For example, a search template may include a template for a structured query language (SQL) search or a search in another type of search language. In some implementations, dynamic search system 230 may select a search template based on a combination and/or quantity of search parameters associated with a search that dynamic search system 230 is to perform. For example, a search template may be structured to receive a particular combination of search parameters (e.g., brand, date, product, etc.). Additionally, or alternatively, and as another example, dynamic search system 230 may select a search template based on a quantity of search parameters associated with a search dynamic search system 230 is to perform (e.g., the search template may be structured to receive one search parameter, two search parameters, three search parameters, etc.). Additionally, or alternatively, and as another example, dynamic search system 230 may select a search template from among multiple search templates (e.g., based on a context of a search, a prior search of a user, an organization for which a user of dynamic search system 230 works, etc.).

In some implementations, dynamic search system 230 may select a search template that is structured to use the same combination and/or quantity of search parameters identified as being included in the input. For example, dynamic search system 230 may determine whether a search template is structured to use the same combination and/or quantity of search parameters identified as being included in the input using first information identifying the combination and/or quantity of search parameters for which a search template is structured and second information identifying a combination and/or quantity of search parameters included in the input (e.g., by performing a comparison of the first information and the second comparison and determining whether a result of the comparison indicates a match). In this way, dynamic search system 230 may select a search template to be used to perform a search without a need for a user requesting the search to have technical knowledge about the search template. This reduces an amount of technical knowledge needed for a user to perform a search of data stored by external information source 220.

In some implementations, dynamic search system 230 may select a search template to be populated for a search (e.g., in real-time as input, or a modification thereto, is received). For example, dynamic search system 230 may populate a search template with information identifying a search parameter, such as by using an identifier associated with a term and/or phrase identified in a dictionary file, a term and/or phrase included in a dictionary file, a term and/or phrase included in the input, and/or the like. For example, dynamic search system 230 may populate a search template with a brand identifier, a product identifier, a term, a phrase, a type identifier that identifies a type of data being searched (e.g., sales data related to purchases of a product, inventory management data related to a product that was ordered, when the product was ordered, a quantity of the product that was ordered, etc.) and/or the like. In this way, dynamic search system 230 may populate a search template with a search parameter with information identifying a search parameter. In some implementations, dynamic search system 230 may populate the search template to generate a search query (e.g., a search query for data that external information source 220 stores). In some implementations, dynamic search system 230 may populate the search template and generate a search query without input from a user requesting the search, thereby reducing an amount of technical knowledge that the user needs.

In this way, dynamic search system 230 may select a search template to be used to perform the search based on the combination and/or quantity of search parameters.

As further shown in FIG. 4, process 400 may include performing the search using the search template populated with information identifying the one or more search parameters (block 450). For example, dynamic search system 230 may perform the search using the search template populated with information identifying the one or more search parameters. In some implementations, dynamic search system 230 may use a populated search template (e.g., a search query) to obtain data from external information source 220. For example, dynamic search system 230 may obtain data based on a search parameter by requesting data related to the search parameter, providing the populated search template to external information source 220, and/or the like. In some implementations, dynamic search system 230 may perform the search in real-time (e.g., as data is being stored in external information source 220), thereby permitting dynamic search system 230 to provide data with increased accuracy relative to performing a search that is not in real-time.

In some implementations, dynamic search system 230 may perform the search (e.g., by querying data from external information source 220). Additionally, or alternatively, dynamic search system 230 may provide a search query to another device (e.g., client device 210 and/or external information source 220) to permit the other device to perform the search. In this way, dynamic search system 230 may perform the search using the search template populated with the one or more search parameters.

As further shown in FIG. 4, process 400 may include performing an action based on a result of performing the search (block 460). For example, dynamic search system 230 may perform an action based on a result of performing the search.

In some implementations, dynamic search system 230 may receive search results based on performing the search. For example, dynamic search system 230 may receive data from external information source 220 based on a generated search query. Additionally, or alternatively, dynamic search system 230 may organize and/or format the search results such that the search results can be provided for display graphically (e.g., using a graphical display, such as charts, graphs, tables, statistics, etc.). In some implementations, when organizing and/or formatting the search results, dynamic search system 230 may normalize data from different external information sources 220, such that the data can be aggregated and/or combined. For example, dynamic search system 230 may normalize the data to a particular time interval, normalize a ranking and/or scoring scheme used, categorize data based on topic, normalize a format or form of the data, categorize the data by external information source 220, categorize the data by type, and/or the like.

In some implementations, dynamic search system 230 may analyze search results to determine which search results are to be provided for display and which search results are to be hidden. For example, dynamic search system 230 may receive additional search results other than those requested by a user of client device 210 (e.g., search results in areas related to a user search query, such as retail sales when a user requested data related to retail returns), and may process the additional search results to prepare the additional search results for presentation without actually providing the additional search results for display. In this way, dynamic search system 230 may selectively determine data to provide for display. In addition, this permits dynamic search system 230 to predict data a user may subsequently request and to quickly provide the data for display if the user subsequently requests the data, thereby improving a user experience.

In some implementations, dynamic search system 230 may re-perform a search and/or receive updates to data for which dynamic search system 230 searched. For example, dynamic search system 230 may receive updates to data in real-time as the data changes. In this case, dynamic search system 230 may update a search result with the new data, may re-organize and/or re-format a search result based on the new data, and/or the like. In some implementations, external information source 220 may push a notification to dynamic search system 230 that an update to data that a user previously requested is available. In this case, dynamic search system 230 may re-perform the search (e.g., based on receiving an indication from client device 210 to obtain the updated data). Additionally, or alternatively, external information source 220 may push the update to dynamic search system 230, and dynamic search system 230 may request that a user indicate whether the user wants the updated data to be provided for display. In this way, dynamic search system 230 may receive data and/or updates to the data in real-time.

In some implementations, dynamic search system 230 may provide recommendations for searches related to the user's search query (e.g., based on the user's search query, the additional search results, etc.). In this way, the dynamic search system may provide the additional (e.g., related) search results in real-time, more quickly than the additional search results would otherwise have been provided (e.g., by re-generating a search query and/or re-populating a template). Furthermore, dynamic search system 230 may conserve computing resources (e.g., processing resources, memory resources, etc.) that would be needed for an additional search.

In some implementations, dynamic search system 230 may store a result of a search. For example, dynamic search system 230 may store a result of a search when, for example, dynamic search system 230 has performed the search a threshold quantity of times, thereby indicating a frequently performed search. Additionally, or alternatively, dynamic search system 230 may store information identifying a parameter of a search, a search template, and/or the like (e.g., when dynamic search system 230 has performed the search a threshold quantity of times).

In some implementations, dynamic search system 230 may perform machine learning using information identifying a search, a result of a search, and/or a search parameter. For example, dynamic search system 230 may perform machine learning to identify a search that a user is likely to request based on prior requested searches. In some implementations, dynamic search system 230 may pre-fetch and cache data for a search that dynamic search system 230 determines a user is likely to request, may select and/or pre-populate a search template, and/or the like. Additionally, or alternatively, dynamic search system 230 may provide information related to a result of performing machine learning to another dynamic search system 230. In this way, dynamic search system 230 may facilitate improvement of a search of another dynamic search system 230.

In some implementations, dynamic search system 230 may generate information for rendering a user interface based on a search query. For example, different search queries may be associated with different types of user interfaces that are provided for display (e.g., different charts, graphs, tables, statistics, etc.). In some implementations, dynamic search system 230 may identify a domain associated with a search (e.g., an industry, such as an automotive industry, a mobile device industry, etc.), and may identify a user interface and/or elements of the user interface to be provided for display based on the domain. Additionally, or alternatively, and as another example, dynamic search system 230 may determine a type of user interface based on a type of data received from external information source 220 (e.g., a total, data organized by category, etc.). In this way, dynamic search system 230 may provide more relevant search results.

In some implementations, dynamic search system 230 may perform another type of action based on a result of a search. For example, dynamic search system 230 may instruct another device to generate an order for a product, to populate an order form, to monitor activity of a department of an organization, to generate a recommendation of a procedure change, and/or the like. This permits dynamic search system 230 to dynamically perform an action based on a result of a search, permits dynamic search system 230 to facilitate improvement of operations of an organization based on a result of a search, and/or the like.

In this way, dynamic search system 230 may perform an action based on a result of performing the search.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
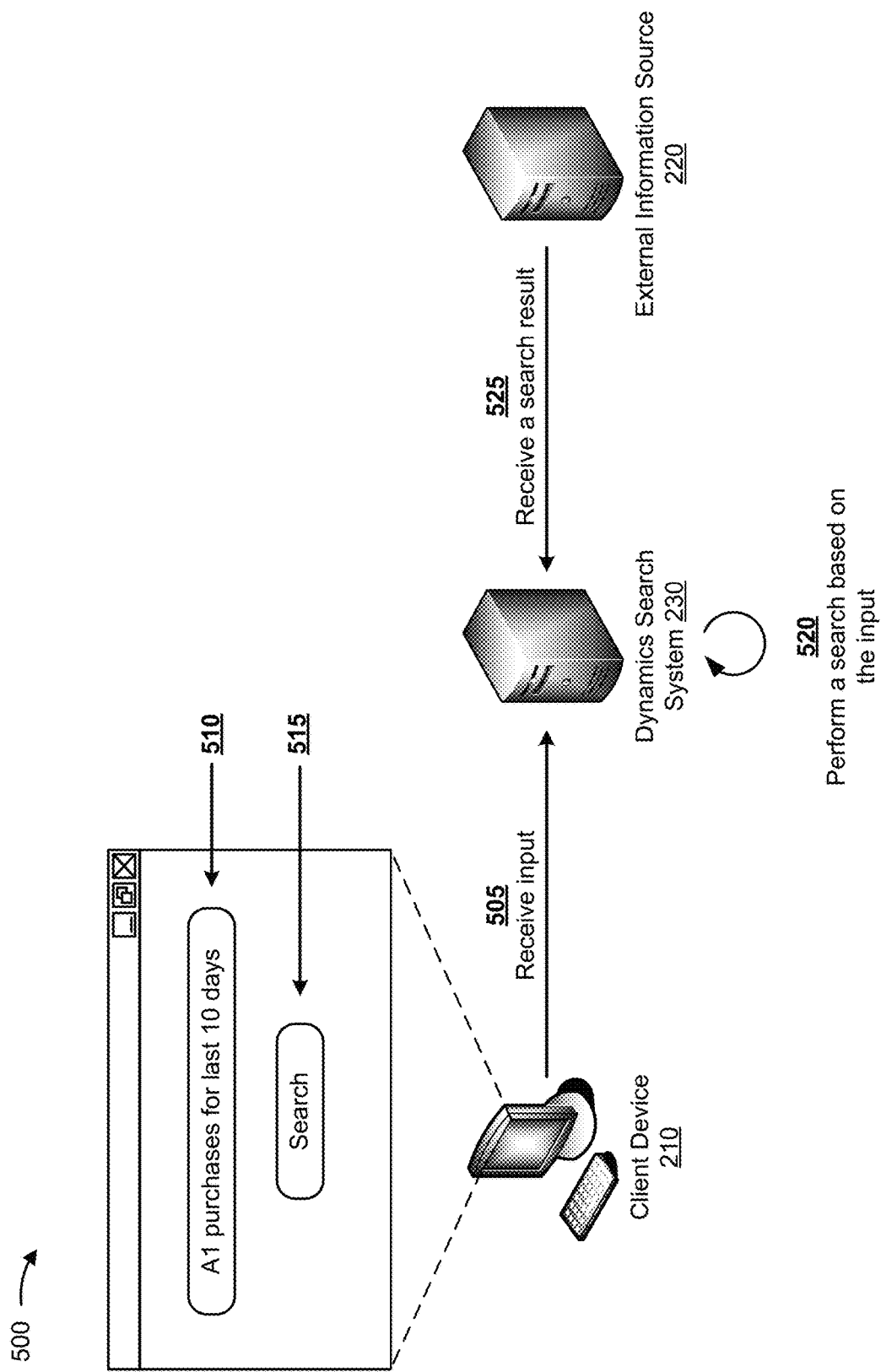
FIGS. 5A-5C are diagrams of an example implementation relating to the example process shown in FIG. 4.
Figure 5B:
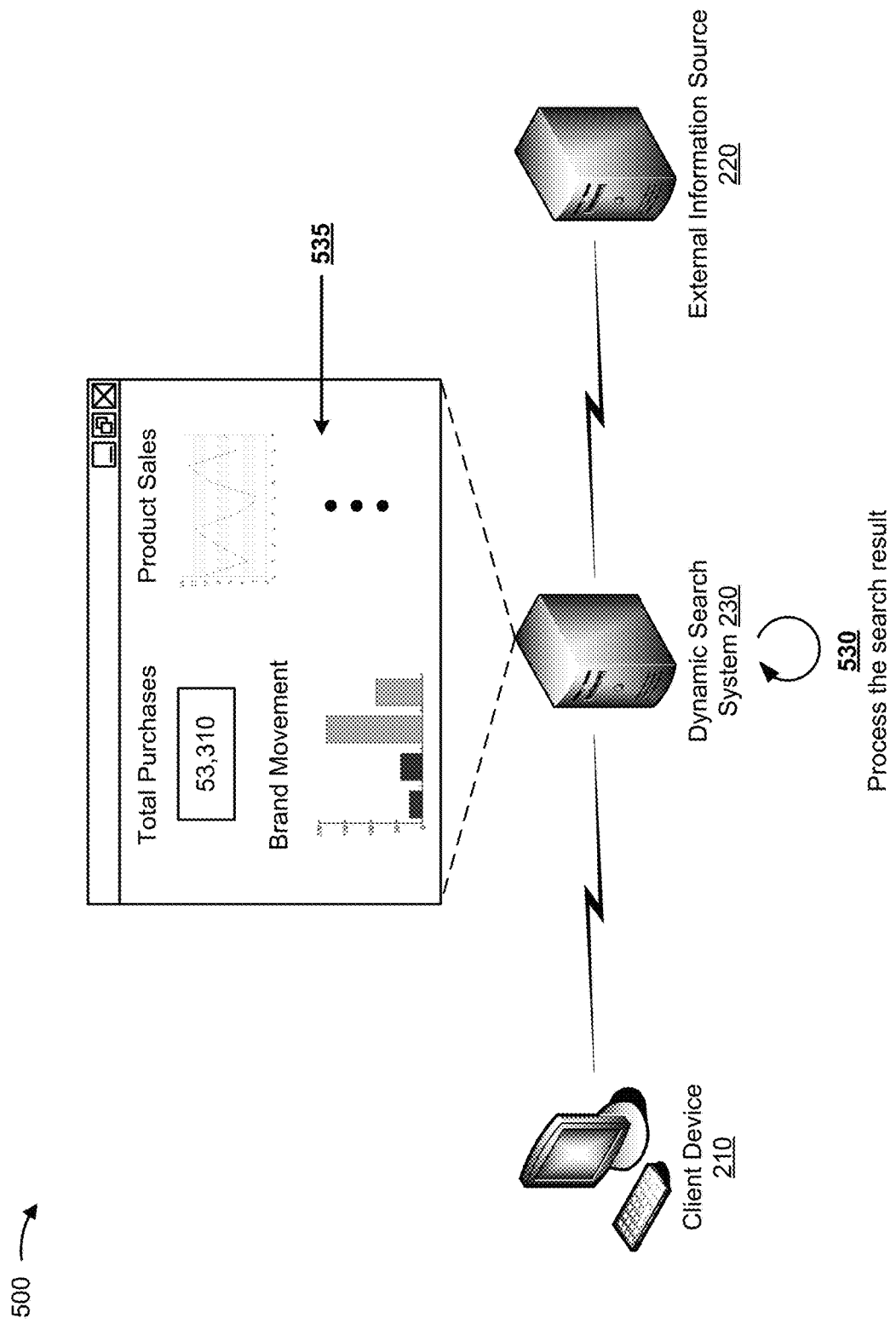
Figure 5C:
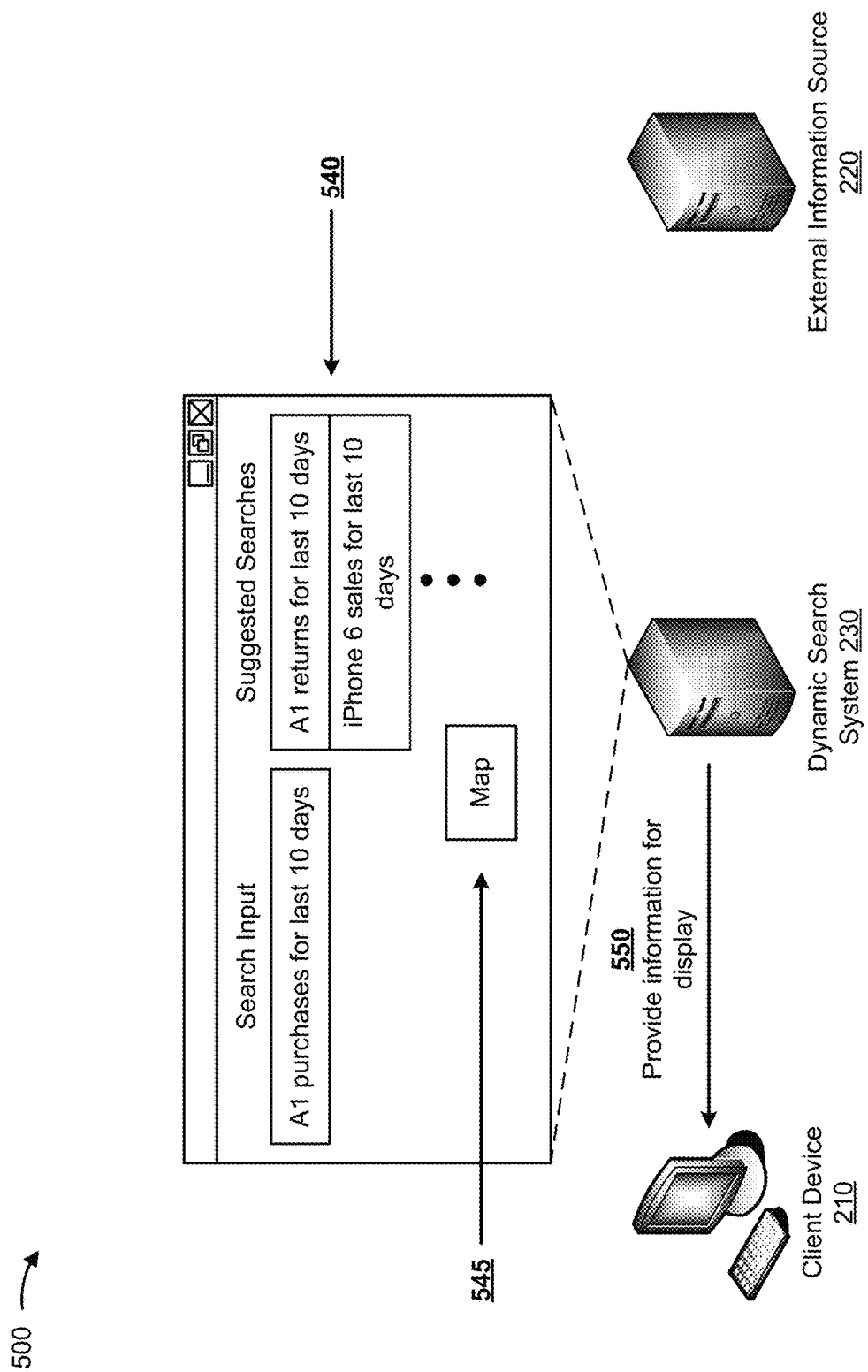

FIGS. 5A-5C are diagrams of an example implementation 500 relating to example process 400 shown in FIG. 4. FIGS. 5A-5C show an example of real-time dynamic search and reporting. As shown, example implementation 500 includes client device 210, external information source 220, and dynamic search system 230.

As shown in FIG. 5A, and by reference number 505, dynamic search system 230 may receive input from client device 210. For example, dynamic search system 230 may receive text and/or voice input. As shown by reference number 510, dynamic search system 230 may receive the input via a user interface associated with dynamic search system 230 and provided for display via client device 210. For example, as shown, the user may input the text "A1 purchases for last 10 days" to search for data related to purchases of brand A1 during the previous 10 days. As shown by reference number 515, a user of client device 210 may initiate a search by selecting a "Search" button displayed on a user interface associated with dynamic search system 230.

As shown by reference number 520, dynamic search system 230 perform a search based on the input. For example, dynamic search system 230 may perform a search of various external information sources 220 for data related to purchases of brand A1 during the previous 10 days. As described elsewhere herein, dynamic search system 230 may determine a combination and/or quantity of search parameters included in the input using a dictionary file and may select a search template to be used to perform the search based on the combination and/or quantity of search parameters included in the input. As shown by reference number 525, dynamic search system 230 may receive a search result from external information source 220. For example, dynamic search system 230 may receive data related to purchases of brand A1 during the previous 10 days.

As shown in FIG. 5B, and by reference number 530, dynamic search system 230 may process the search result. For example, dynamic search system 230 may determine a type of data received, may determine a format of the data, may aggregate the data, may analyze the data, and/or the like, as described elsewhere herein. In some implementations, dynamic search system 230 may configure a user interface based on the processing the data (e.g., by providing particular user interface elements for display and hiding other user interface elements). Continuing with the previous example, and as shown by reference number 535, dynamic search system 230 may determine to provide various charts, graphs, totals, and/or the like for display based on processing the data.

As shown in FIG. 5C, and by reference number 540, dynamic search system 230 may determine suggested searches. For example, dynamic search system 230 may determine a suggested search by identifying a term and/or phrase in a dictionary file (e.g., when the input includes a term and/or phrase that is a partial match with a dictionary file). This improves a search by permitting a user to modify input to exactly match a term and/or phrase included in a dictionary file. Additionally, or alternatively, and as another example, dynamic search system 230 may determine a suggested search based on searches that other users requested in association with requesting the current search. As shown by reference number 545, dynamic search system 230 may permit a user to open a map and select a geographic location for modifying a search. For example, a user may modify a search for brand A1 sales during the previous 10 days to the country of India, by selecting India on a map. In this way, dynamic search system 230 may use a location identifier, a set of coordinates (e.g., latitude and/or longitude coordinates), and/or the like, to modify a search.

As shown by reference number 550, dynamic search system 230 may provide information for display. For example, dynamic search system 230 may provide charts, graphs, suggested searches, a map, a search result, and/or the like for display (e.g., via client device 210).

As indicated above, FIGS. 5A-5C are provided merely as an example. Other examples are possible and may differ from what was described with regard to FIGS. 5A-5C.

Some implementations, described herein, provide a dynamic search system that is capable of receiving input indicating one or more search parameters associated with a search, performing a comparison of the input and a dictionary file, determining a combination and/or quantity of search parameters associated with the search, selecting a search template to be used to perform the search, performing the search using the search template, and/or performing an action after performing the search.

In this way, the implementations provide an intuitive and accessible way for users to obtain a wide variety of information from databases in real-time without deep technical knowledge of database search queries. This increases an efficiency of obtaining information from databases by reducing an amount of time needed to obtain the information and/or reducing an amount of technical knowledge needed to obtain the information. In addition, this conserves processing resources of a dynamic search system by reducing or eliminating improperly formatted search queries and/or by reducing a quantity of searches performed by the dynamic search system.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive input indicating one or more search parameters associated with a search,
the input including text data or audio data, and
the input including retail information associated with a product;
perform a comparison of the input and a dictionary file to identify the one or more search parameters associated with the search,
the dictionary file being associated with a domain specific language,
the domain specific language being a retail-related domain specific language, and
the dictionary file including retail-related terms and phrases,
the retail-related terms and phrases including one or more of:
sales,
the sales being used with a search for sales data related to purchase of the product, or
returns,
the returns being used with a search for returns data related to returns of the product;
determine a combination or quantity of search parameters associated with the search based on a result of the comparison;
select a search template to be used to perform the search based on the combination or quantity of search parameters,
the search template to be populated with information identifying the one or more search parameters,
the information including a first type of information, a second type of information, and a third type of information,
the search template including a first parameter, a second parameter, and a third parameter,
the search template being structured to receive:
the first type of information as the first parameter,
the second type of information as the second parameter, and
the third type of information as the third parameter, and
the first type of information, the second type of information, and the third type of information being different;
perform the search using the search template populated with the information identifying the one or more search parameters,
the search being of an information source; and
perform multiple actions based on a result of performing the search,
where the one or more processors, when performing the multiple actions, are to:
identify an industry associated with the search,
identify a user interface, to be provided for display, based on the industry, and
provide a recommendation for another search based on a result of performing machine learning related to the search or the result of performing the search.

2. The device of claim 1, where the one or more processors are further to:
identify a first term or phrase included in the dictionary file that matches a second term or phrase included in the input,
the first term or phrase being included in the domain specific language;
map the first term or phrase to an identifier that identifies the first term or phrase; and
where the one or more processors, when determining the combination or quantity of search parameters, are to:
determine the combination or quantity of search parameters after mapping the first term or phrase to the identifier.

3. The device of claim 1, where the one or more processors are further to:
identify a term or phrase included in the dictionary file when the result of the comparison indicates an exact match.

4. The device of claim 1, where the one or more processors are further to:
identify a term or phrase included in the dictionary file when the result of the comparison indicates a partial match.

5. The device of claim 1, where the one or more processors are further to:
determine that the result of the comparison indicates a match;
traverse a hierarchy of nodes associated with the dictionary file to determine an identifier associated with the match; and
where the one or more processors, when determining the combination or quantity of search parameters, are to:
determine the combination or quantity of search parameters using the identifier.

6. The device of claim 1, where the one or more processors, when performing the multiple actions, are to:
organize the result of performing the search to permit the result of performing the search to be provided for display as a graphical display;
re-perform the search after receiving an indication to re-perform the search; and
update the result of performing the search or the graphical display based on re-performing the search.

7. The device of claim 1, where the one or more processors, when performing the multiple actions, are to:
generate the recommendation for another search based on at least one of:
the search, or
the result of performing the search; and
provide the recommendation for display after generating the recommendation.

8. A method, comprising:
receiving, by a device, input indicating multiple search parameters associated with a search,
the input including retail information associated with a product;
performing, by the device, multiple comparisons of the input and multiple dictionary files to identify the multiple search parameters associated with the search,
the multiple dictionary files including multiple terms or phrases that the device can use to perform the search,
at least one dictionary file of the multiple dictionary files being associated with a retail-related domain specific language, and
the at least one dictionary file including retail-related terms and phrases,
the retail-related terms and phrases including one or more of:
sales,
the sales being used with a search for sales data related to purchase of the product, or
returns,
the returns being used with a search for returns data related to returns of the product, and
the multiple terms or phrases corresponding to the multiple search parameters;
determining, by the device, the multiple search parameters associated with the search based on multiple results of the multiple comparisons;
selecting, by the device, multiple search templates to be used to perform the search based on the multiple search parameters,
the multiple search templates to be populated with information identifying the multiple search parameters,
the information including a first type of information, a second type of information, and a third type of information,
the multiple search templates including a first parameter, a second parameter, and a third parameter,
the multiple search templates being structured to receive:
the first type of information as the first parameter,
the second type of information as the second parameter, and
the third type of information as the third parameter, and
the first type of information, the second type of information, and the third type of information being different; populating, by the device, the multiple search templates with the information,
the information being obtained from the multiple dictionary files;
performing, by the device, the search using the multiple search templates populated with the multiple search parameters; and
performing, by the device, multiple actions based on multiple results of performing the search,
where performing the multiple actions comprises:
identifying an industry associated with the search,
identifying a user interface, to be provided for display, based on the industry; and
providing a recommendation for another search based on a result of performing machine learning related to the search or the result of performing the search.

9. The method of claim 8, further comprising:
identifying a match between the input and the multiple dictionary files when:
a first term included in the input is a synonym of a second term, of the multiple terms or phrases, included in the multiple dictionary files,
the first term and the second term have a threshold quantity or percentage of characters that are the same, or
the first term and the second term have a third term that is a root term of the first term and the second term; and
determining the multiple results of the multiple comparisons based on identifying the match.

10. The method of claim 8, further comprising:
determining that the multiple search templates are structured to receive the multiple search parameters; and
where selecting the multiple search templates comprises:
selecting the multiple search templates based on determining that the multiple search templates are structured to receive the multiple search parameters.

11. The method of claim 8, further comprising:
generating multiple search queries after populating the multiple search templates; and
where performing the search comprises:
performing the search based on generating the multiple search queries.

12. The method of claim 8, where performing the multiple actions comprises:
receiving the multiple results of performing the search from multiple information sources; and
normalizing the multiple results of performing the search after receiving the multiple results.

13. The method of claim 8, where performing the multiple actions comprises:
receiving multiple indications that multiple users of the device have selected multiple geographic locations on a map; and
modifying the search to restrict the search to data related to the multiple geographic locations based on receiving the multiple indications.

14. The method of claim 8, where the multiple search parameters include:
multiple terms or phrases,
multiple identifiers associated with terms or phrases, or
multiple nodes included in multiple hierarchies of nodes associated with the multiple dictionary files.

15. A non-transitory computer-readable medium storing instructions, the instructions comprising:
one or more instructions that, when executed by one or more processors, cause the one or more processors to:
receive input indicating one or more search parameters associated with one or more searches,
the input including retail information associated with a product;
perform one or more comparisons of the input and one or more dictionary files to identify the one or more search parameters associated with the one or more searches,
at least one dictionary file of the one or more dictionary files being associated with a retail-related domain specific language, and
the at least one dictionary file including retail-related terms and phrases,
the retail-related terms and phrases including one or more of:
sales, the sales being used with a search for sales data related to purchase of the product, or returns,
the returns being used with a search for returns data related to returns of the product, and
the one or more dictionary files including one or more hierarchies of nodes that can be traversed to identify the one or more search parameters;
determine one or more combinations or quantities of search parameters associated with the one or more searches based on one or more results of the one or more comparisons,
the one or more combinations or quantities of search parameters being associated with one or more search templates to be used to perform the one or more searches;
select the one or more search templates based on the one or more combinations or quantities of search parameters,
the one or more templates to be populated with information identifying the one or more search parameters,
the information including a first type of information, a second type of information, and a third type of information,
the one or more templates including a first parameter, a second parameter, and a third parameter,
the one or more templates being structured to receive:
the first type of information as the first parameter,
the second type of information as the second parameter, and
the third type of information as the third parameter, and
the first type of information, the second type of information, and the third type of information being different;
populate the one or more search templates with the information,
the information being identified by traversing the one or more hierarchies of nodes included in the one or more dictionary files;
perform the one or more searches using the one or more search templates populated with the information; and
perform multiple actions based on one or more results of performing the one or more searches,
where the one or more instructions, that cause the one or more processors to perform the multiple actions, cause the one or more processors to:
identify an industry associated with the search,
identify a user interface, to be provided for display, based on the industry, and
provide a recommendation for another search based on a result of performing machine learning related to the search or the result of performing the search.

16. The non-transitory computer-readable medium of claim 15, where the one or more instructions, when executed by the one or more processors, further cause the one or more processors to:
obtain data from one or more information sources using the one or more search templates; and
where the one or more instructions, that cause the one or more processors to perform the multiple actions, cause the one or more processors to:
perform the multiple actions after obtaining the data from the one or more information sources.

17. The non-transitory computer-readable medium of claim 15, where the one or more instructions, that cause the one or more processors to perform the multiple actions, cause the one or more processors to:
generate information associated with rendering one or more user interfaces based on the one or more results of performing the one or more searches; and
provide the information to a device to cause the device to render the one or more user interfaces in a particular manner based on the information associated with rendering the one or more user interfaces.

18. The non-transitory computer-readable medium of claim 15, where the one or more instructions, when executed by the one or more processors, further cause the one or more processors to:
map one or more terms or phrases included in the input to one or more identifiers identified using the one or more dictionary files; and
where the one or more instructions, that cause the one or more processors to determine the one or more combinations or quantities of search parameters, cause the one or more processors to:
determine the one or more combinations or quantities of search parameters based on the one or more identifiers.

19. The non-transitory computer-readable medium of claim 15, where the one or more instructions, when executed by the one or more processors, further cause the one or more processors to:
determine whether the one or more search templates are associated with a same one or more combinations or quantities of search parameters as are indicated by the input; and
where the one or more instructions, that cause the one or more processors to select the one or more search templates, cause the one or more processors to:
select the one or more search templates based on determining whether the one or more search templates are associated with the same one or more combinations or quantities of search parameters as are indicated by the input.

20. The non-transitory computer-readable medium of claim 15, where the one or more instructions, when executed by the one or more processors, further cause the one or more processors to:
process the input using:
natural language processing, or
speech-to-text processing; and
where the one or more instructions, that cause the one or more processors to perform the one or more comparisons, cause the one or more processors to:
perform the one or more comparisons after processing the input.

* * * * *